Figure 1:
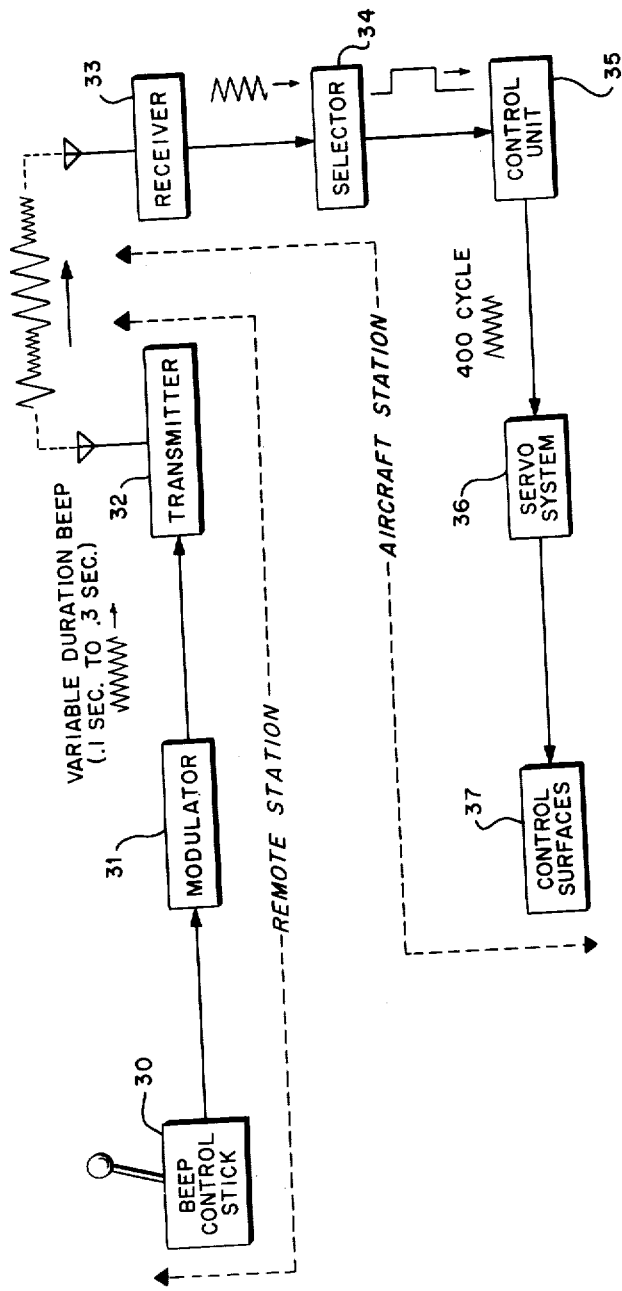

INVENTORS
DONALD M. LAUDERDALE
SAMUEL KATZ

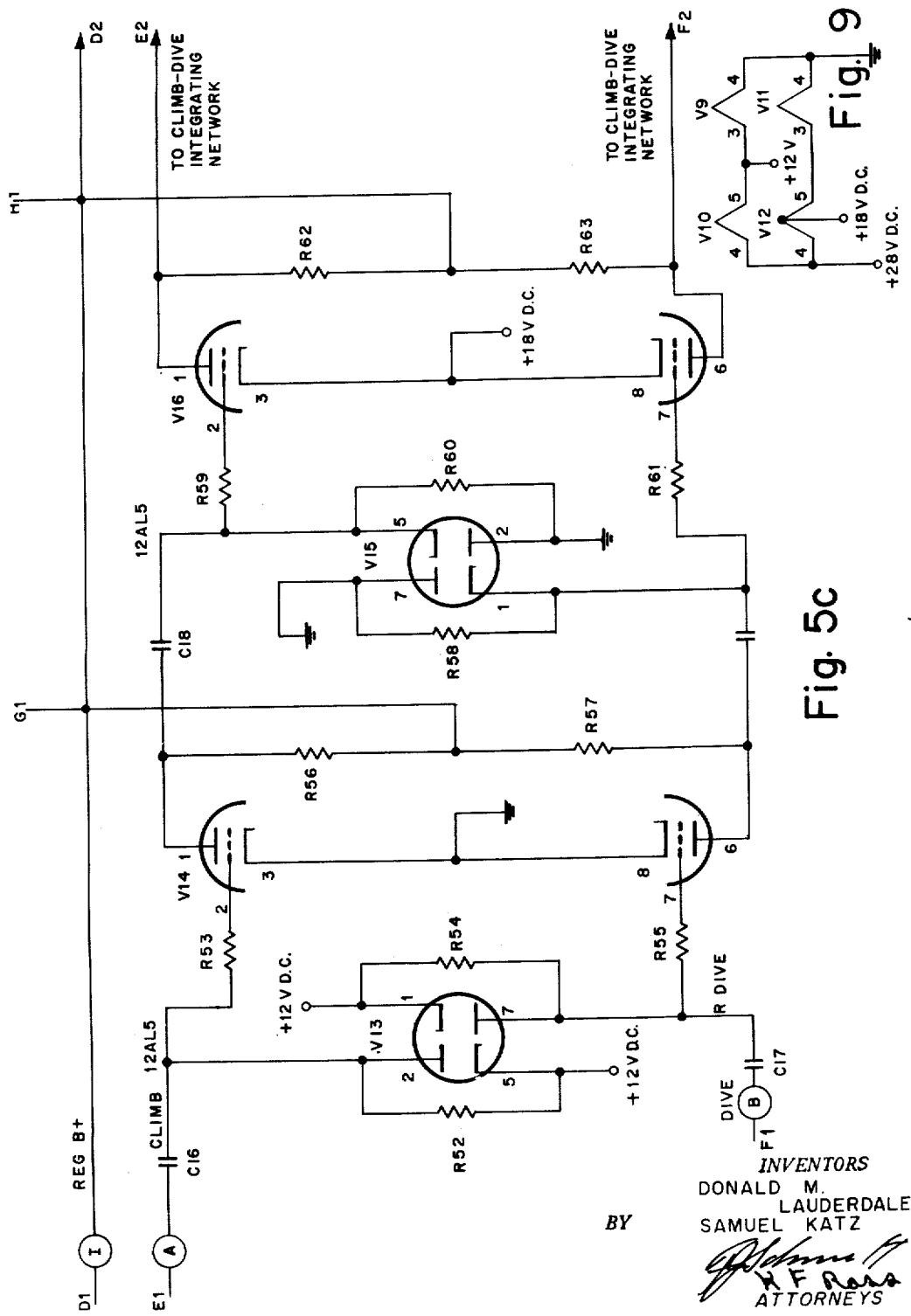

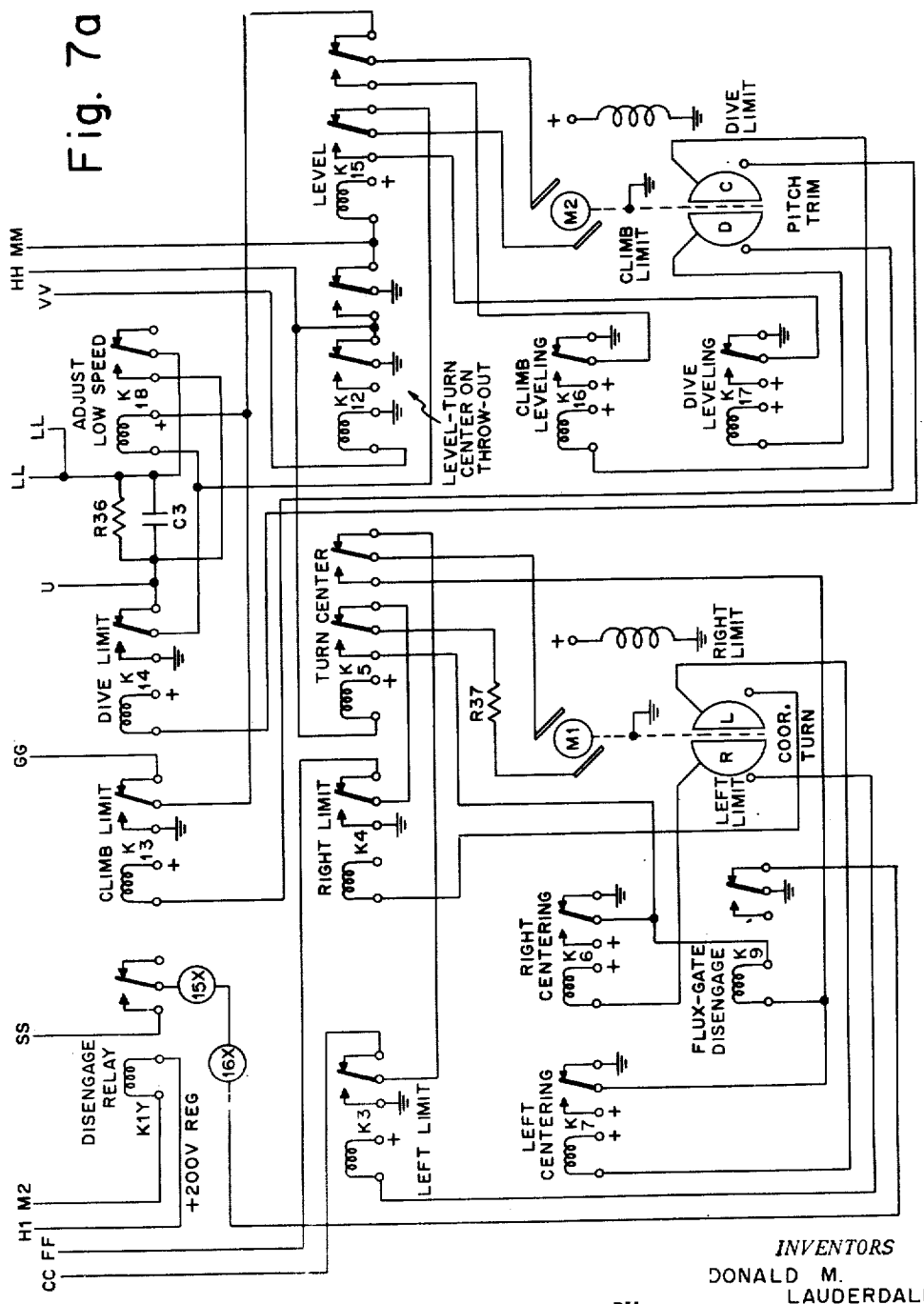

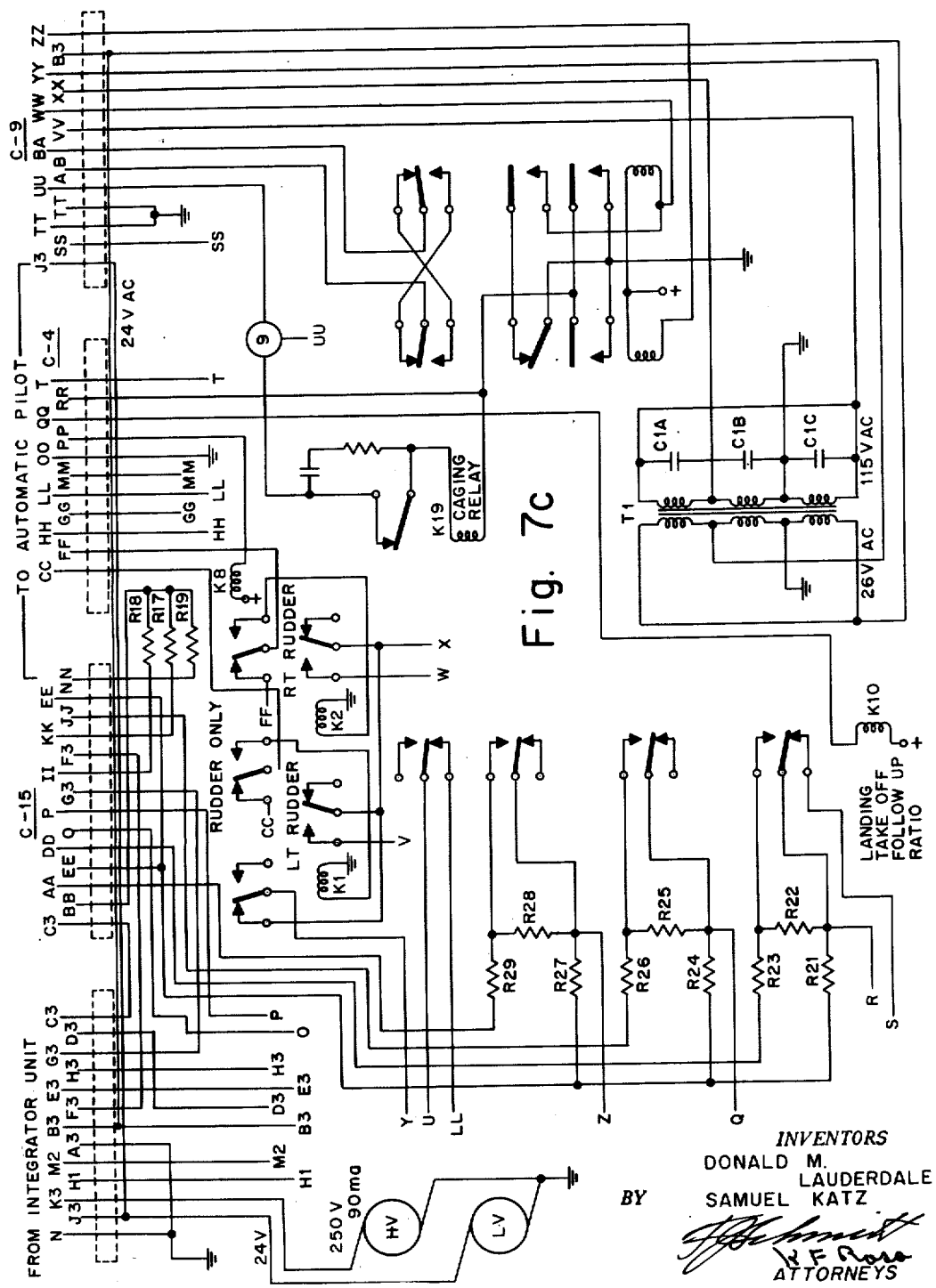

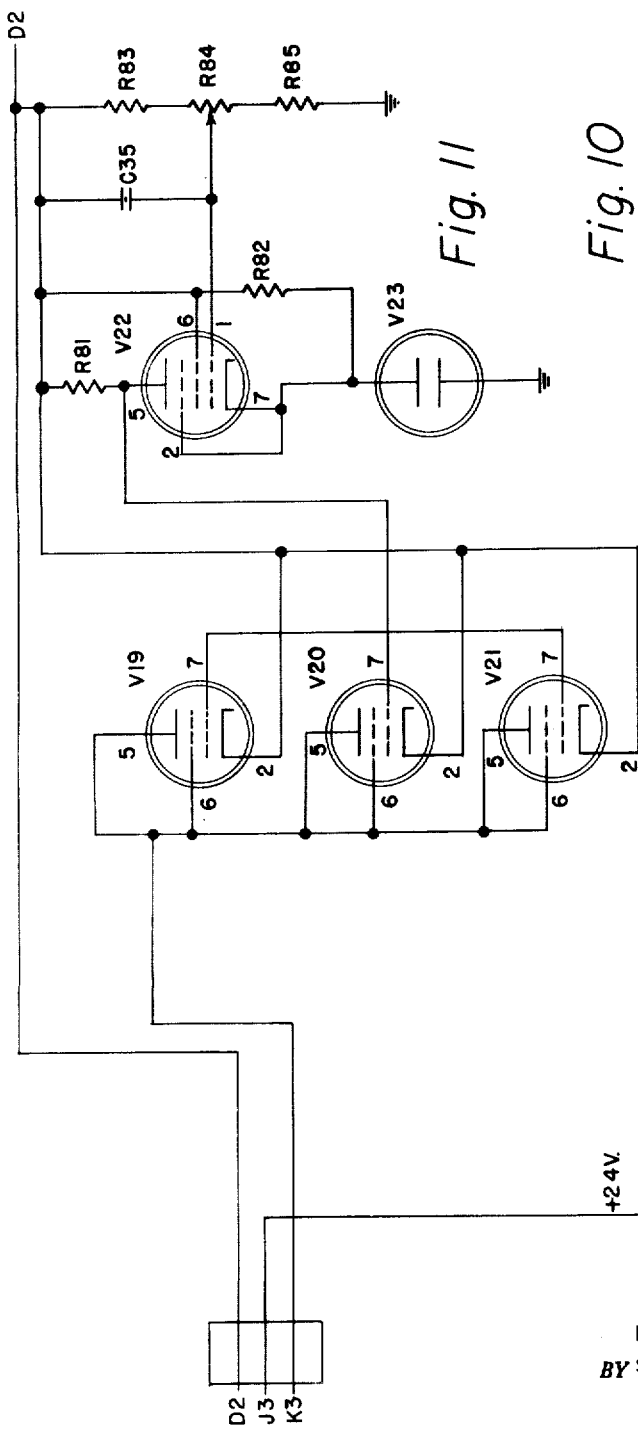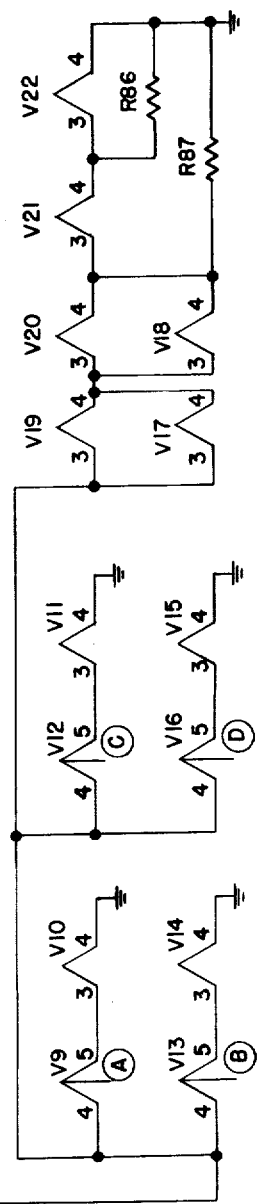

United States Patent Office 2,810,533
Patented Oct. 22, 1957

2,810,533

SYSTEM FOR REMOTE PROPORTIONAL CONTROL OF AIRCRAFT ATTITUDE

Donald M. Lauderdale, Austin, Tex., and Samuel Katz, Philadelphia, Pa.

Application October 11, 1954, Serial No. 461,698

9 Claims. (Cl. 244—14)

(Granted under Title 35, U. S. Code (1952), sec. 266)

The invention described herein may be manufactured and used by or for the Government of the United States of America for governmental purposes without the payment of any royalties thereon or therefor.

The present invention relates to a system for remote proportional control of aircraft attitude and more particularly relates to a method and apparatus to improve the precision of remote control exercised over drone aircraft during certain maneuvers, particularly during flare-out and touch down.

Although the exact function of the invention is not believed to have been heretofore carried out, a function similar to that of this invention has been effected in the past by a system referred to as beep stick control, wherein an operator desiring to effect functions as aircraft climb, for example, momentarily pulls backward on a beep stick control at a remote station, thereby keying a modulator to impress supersonic modulation on a transmitter carrier. At the aircraft this modulated signal is detected, fed into a selector unit and eventually output voltage is introduced into the signal circuits of an autopilot servo system, thereby making attitude of the aircraft proportional to the sum of increments of time that the beep stick is held in climb position. Similarly, functions are keyed in for dive, turn, etc. The total length of time the beep stick is held in one position determines the corresponding aircraft attitude.

A significant disadvantage of this method is that the attitude of the aircraft at any given time is a cumulative function of the duration and sequence of beeps that have been transmitted from remote stations. If the aircraft is clearly visible a position of reference is available and this disadvantage may not be critical. However, if for any reason the aircraft is not plainly visible, its attitude for other than straight and level flying must be estimated from the duration and sequence of beeps that have been transmitted. This is a difficult feat even for experienced personnel. During flare-out and touch down, it is advantageous to be able to control the aircraft about its three axes of motion simultaneously. With the beep system of control, commands can only be transmitted in a sequential fashion which seriously restricts the preciseness of control and introduces additional time delay.

The present invention overcomes these and other disadvantages of the prior art and in addition, provides mechanism so that both the climb-dive channel and the turn channel can be keyed simultaneously and provides for proportionality of aircraft attitude to control stick displacement. These features enable the remote control pilot to maneuver the aircraft with a greater "feel" for the control stick and more precisely than is possible using a beep system. Further advantages of the inventive system are relative simplicity in design and the fact that the system can be made to utilize existing components of the prior art systems. In addition, by use of a simple switching arrangement either the prior art system or the proportional control system of the present invention may be made available to a remote control pilot using the equipment of the invention.

Accordingly, one purpose of the present invention is to provide a system of a remote proportional control of aircraft attitude.

Another object of the invention is to provide mechanism to improve the precision of remote control exercised over drone aircraft during certain maneuvers, particularly during flare-out and touch down.

Another aim of the invention is to provide for mechanism for remote proportional control of aircraft attitude wherein improved precision of remote control may be exercised over drone aircraft.

Another object of the invention is to provide a clearly obtainable position of reference in maneuvers of drone aircraft.

Still another object of the invention is to provide mechanism wherein aircraft may be controlled about three axes of motion simultaneously.

Another aim of the invention is to provide a system of control wherein commands need not be transmitted in sequential fashion and wherein inaccuracy of control and time delay are eliminated.

Still another object of the invention is to provide a remote control system for aircraft wherein both change in pitch attitude and turn can be keyed simultaneously and wherein aircraft attitude is proportional to control stick displacement.

Still another purpose of the invention is to provide remote control mechanism wherein a remote control pilot may maneuver the aircraft with a greater feel for the control stick and more precisely than is possible with existing systems.

Another object of the invention is to provide a proportional control system which will be relatively simple in design and which can be made to utilize existing components of other systems.

Another purpose of the invention is to provide mechanism for remote control which will be simple in design, rugged in construction, reliable in use, which will eliminate necessity for extensive repairs and in which greater facility for executing maneuvers may be incorporated.

Figure 2:
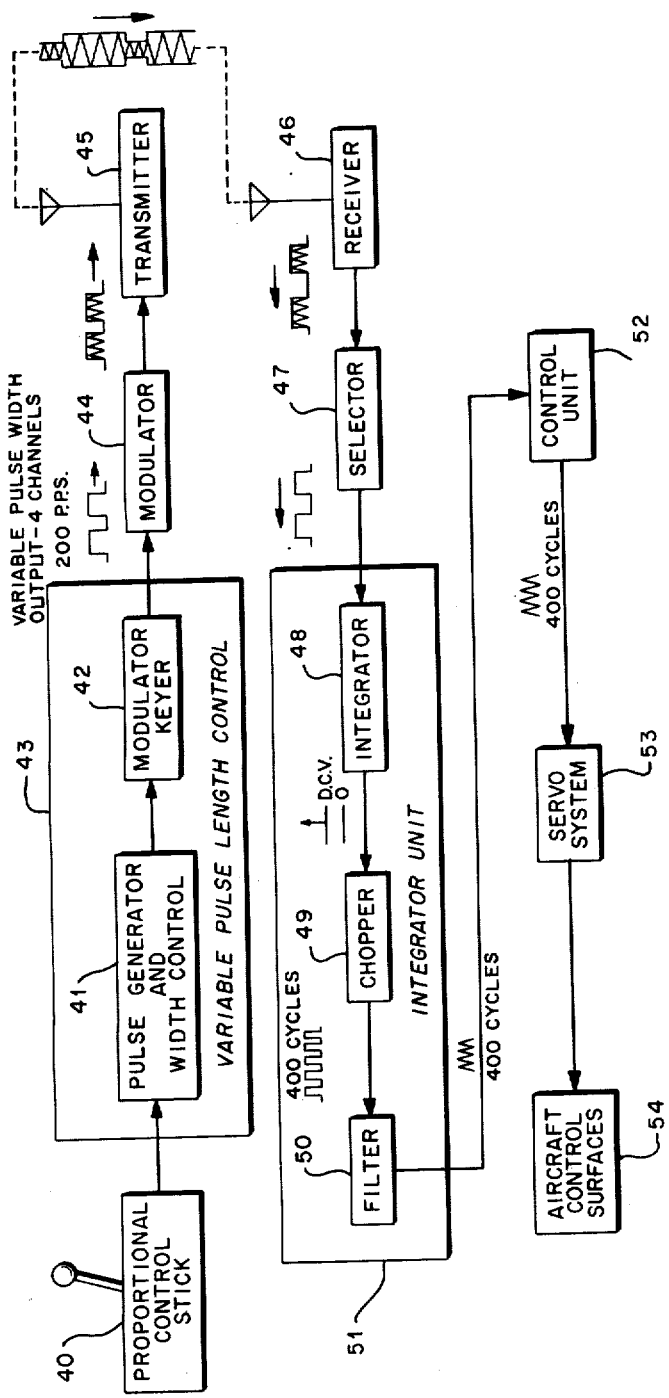
Figure 3:
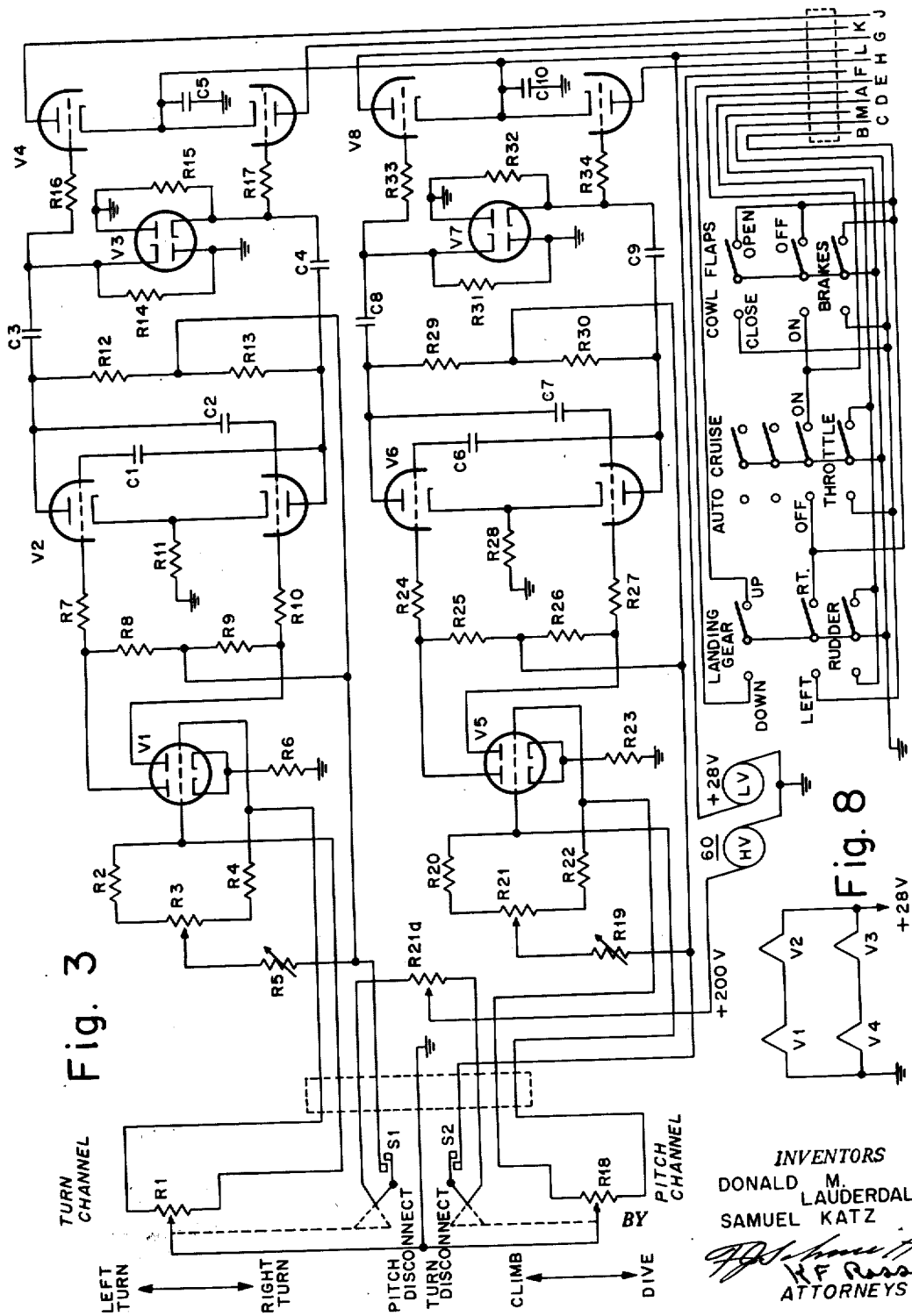
Figure 4:
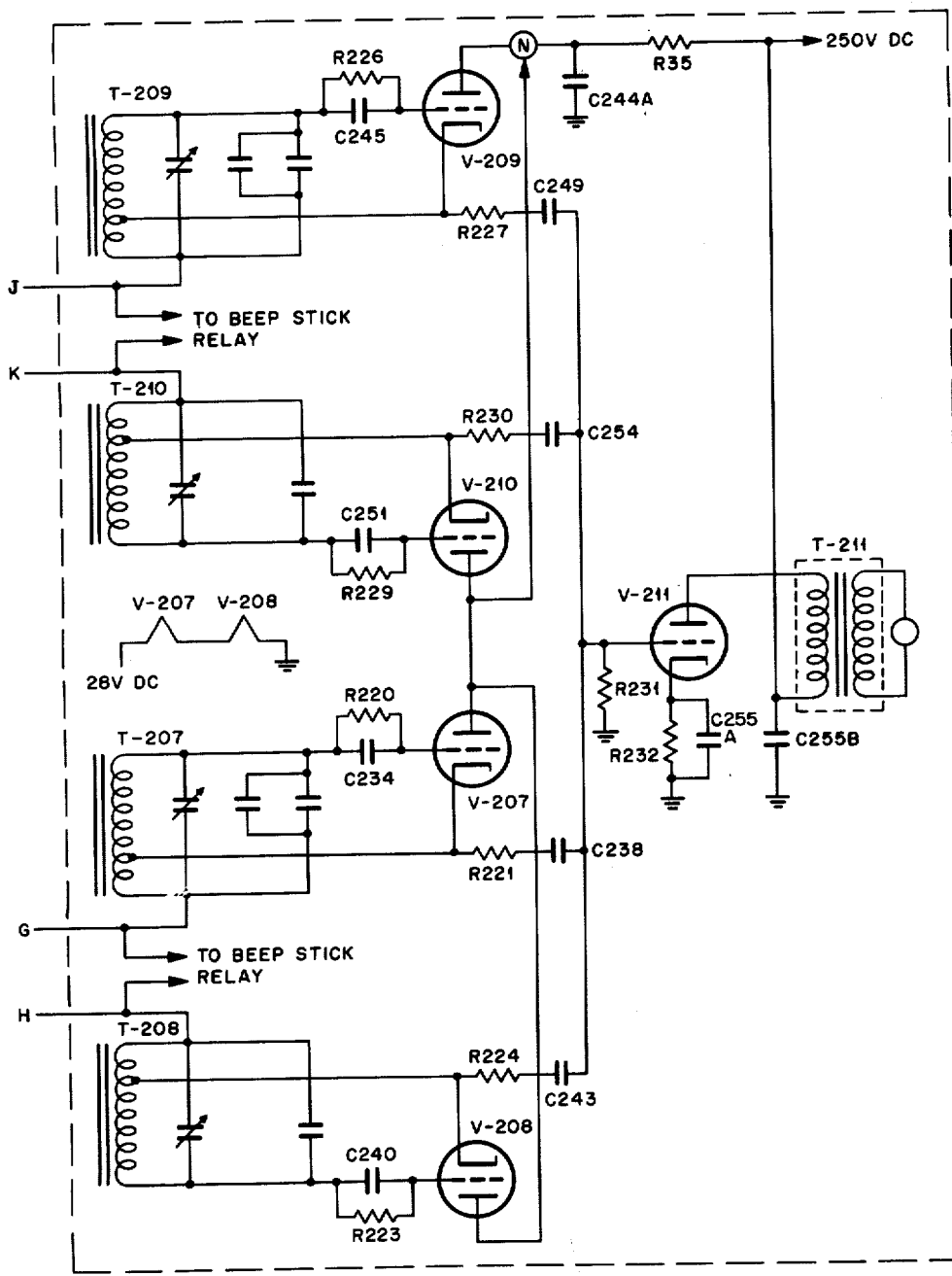
Figure 5A:
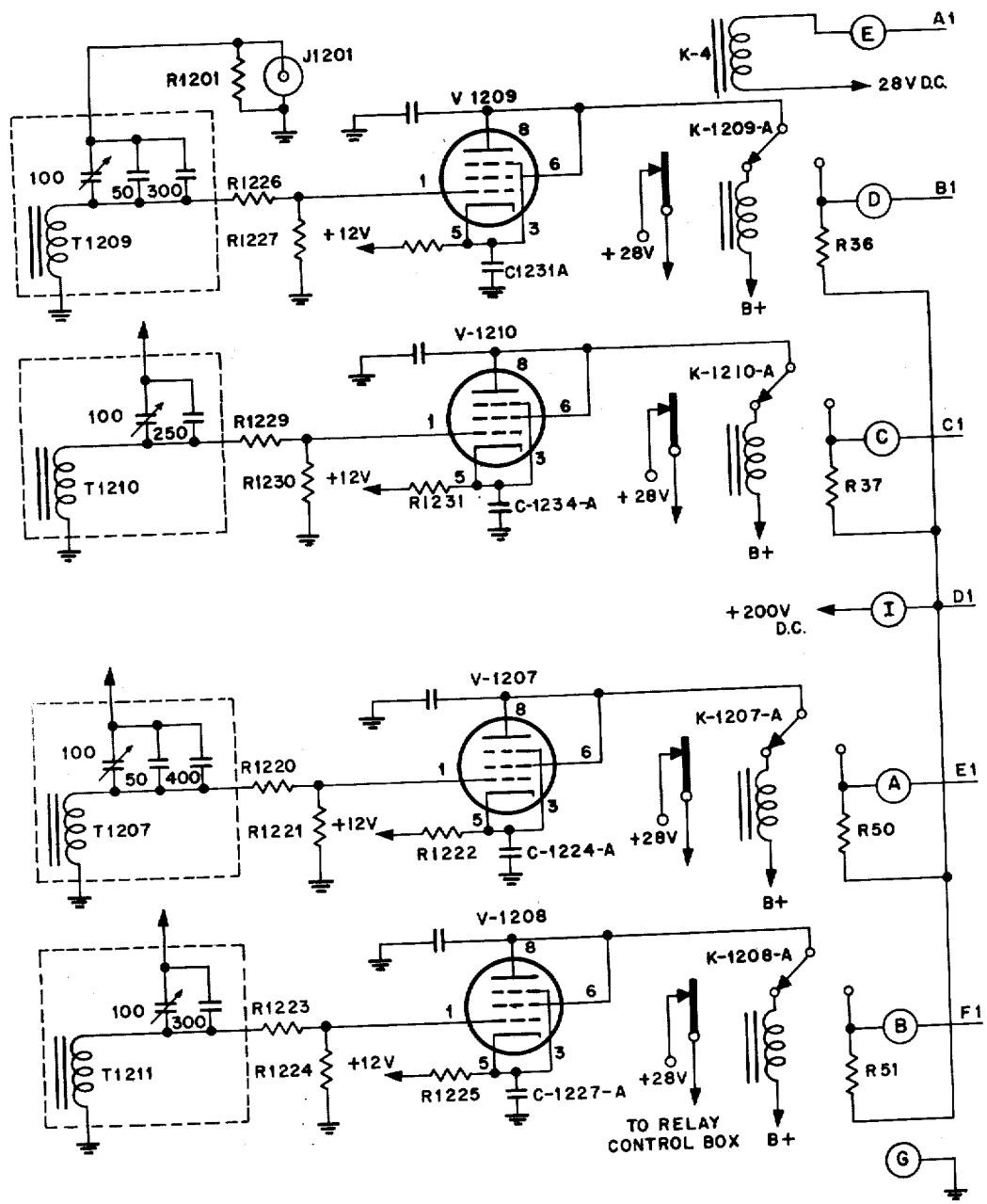
Figure 5B:
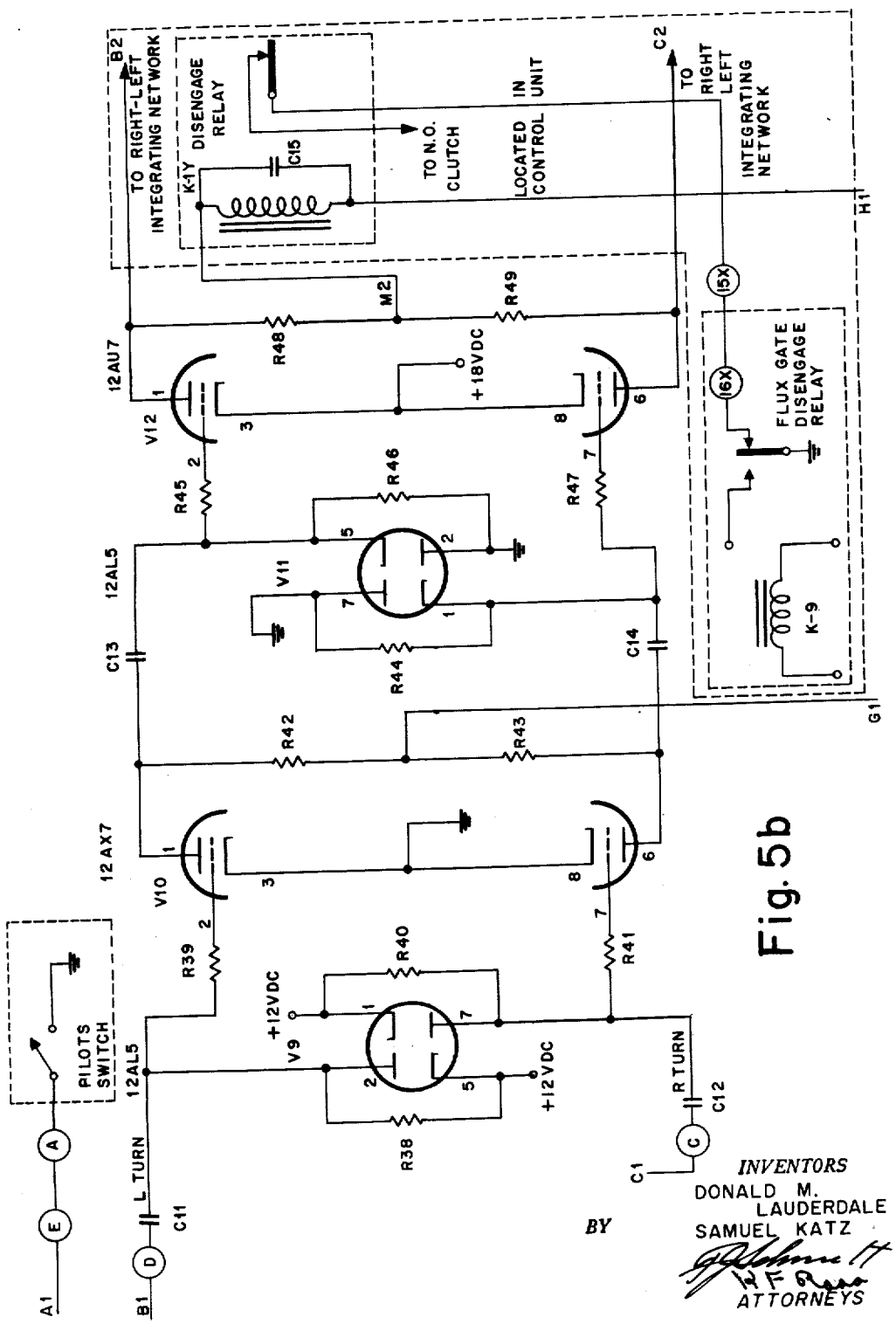
Figure 6:
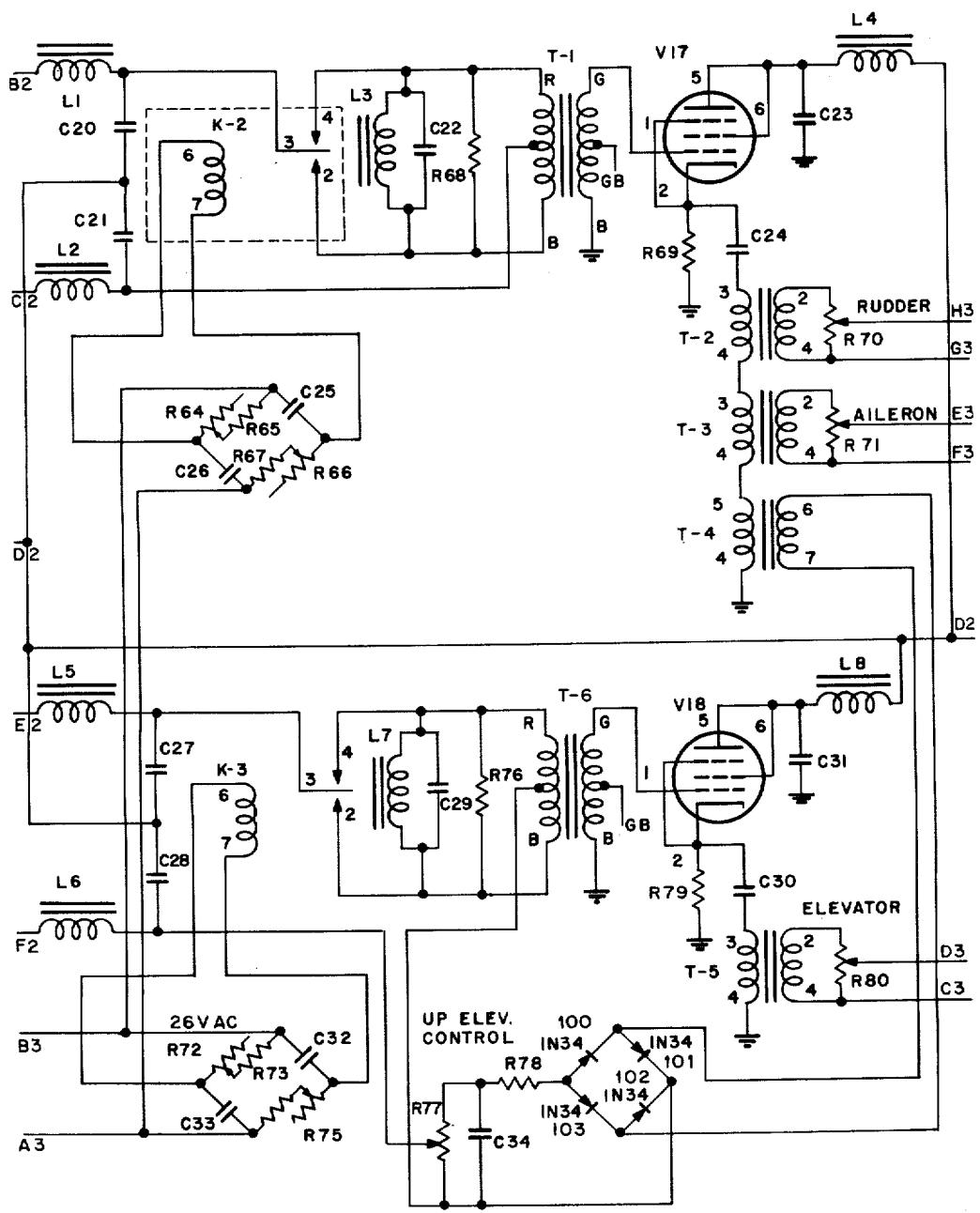
Figure 7B:
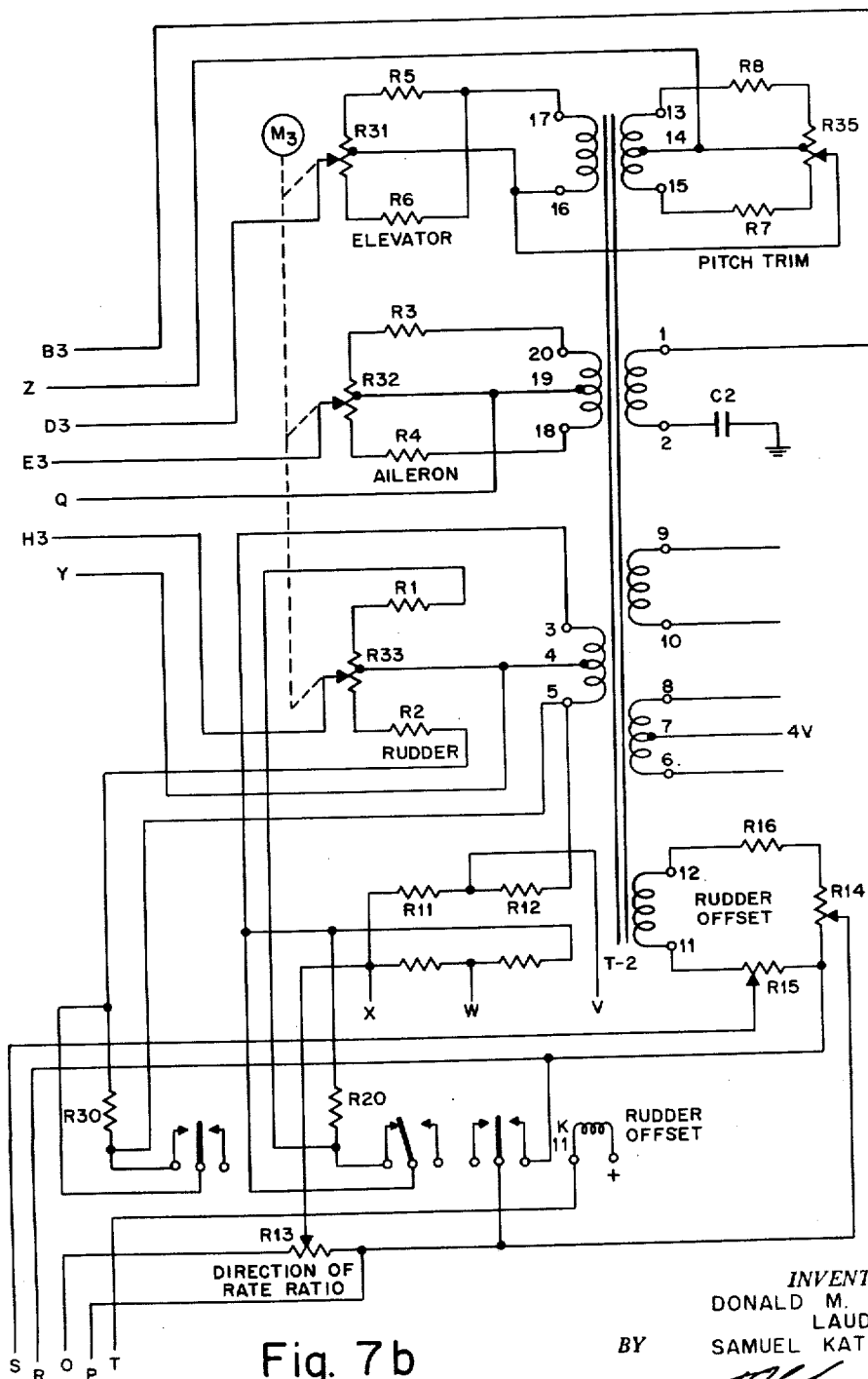

Other objects and many of the attendant advantages of this invention will be readily appreciated as the same becomes better understood by reference to the following detailed description when considered in connection with the accompanying drawings wherein:

Fig. 1 is a block diagram of an existing remote beep control system,

Fig. 2 is a block diagram of a preferred embodiment of the remote proportional control system of the present invention, Fig. 3 is a schematic diagram of the variable pulse length control apparatus incorporated in the illustrative embodiment of the instant invention, and includes junctions of the apparatus into auto-pilot control relay contacts, Fig. 4 is a schematic diagram of the modulator unit including the filament voltage circuit to the modulator filaments, Figs. 5A, 5B and 5C are to be taken together and present a schematic representation of the selector and limiter circuit of the instant invention, Fig. 6 is a schematic representation of the integrator unit of the illustrative embodiment of the present invention, Figs. 7A, 7B and 7C are to be taken together and present a schematic representation of the modified automatic pilot control unit of the preferred embodiment of the instant invention, Figs. 8, 9 and 10 schematically show the filaments of stages illustrating application of voltage thereto, and, Fig. 11 is a schematic representation of the regulated power supply of the preferred embodiment.

In the following description the abbreviation D. C.

will be used to designate direct current and the abbreviation A. C. will be used to designate alternating current. The words "upper," "lower," "left" and "right" may designate physical tube and part positions as shown on the drawings.

Referring to the drawings and particularly to the beep system shown in Fig. 1, when it is desired that the aircraft perform a function such as a climb function, the beep stick control 30 at the remote station may be momentarily pulled backward. In this position, the climb channel of the modulator 31 is keyed, thereby impressing supersonic modulation on the transmitter carrier provided by transmitter 32. A wave form as shown at the antenna of transmitter 32 will thereby result. At the aircraft this modulated signal is detected at receiver 33 and the supersonic signal is fed into the selector unit 34. In this unit, a tuned circuit tuned to the frequency of the incoming signal operates a relay. The relay closes a D. C. voltage circuit connected with a motor in the control unit 35. The motor then drives a potentiometer to a position determined by the duration of the applied D. C. voltage. The potentiometer may be connected across a source of A. C. (alternating current) voltage. The A. C. voltage output from the potentiometer will then have a magnitude determined by its position. This generates a 400 cycle per second output voltage which is introduced into the signal circuits of the conventional auto-pilot servo system 36. In that way the attitude of the aircraft in a climb is made proportional to the sum of the increments of time that the beep stick is held in its climb position. Similar occurrence results for the other functions, dive, right turn, and left turn, the total length of time the beep stick is held forward, right, or left determining a corresponding aircraft attitude. The servo system of a conventional auto-pilot will then cause manipulation of the aircraft control surfaces to cause them to assume a position corresponding to the signal keyed in which will cause the aircraft to thereby assume the resulting attitude. Appropriate follow-up systems are, of course, provided to return the control surfaces to neutral position.

As indicated, this method has the disadvantage that the attitude of the aircraft is at any given time a cumulative function of the duration and sequence of beeps that have been transmitted from the remote station. If the aircraft is clearly visible, a position of reference is always available and this disadvantage is not a serious one. However, if for any reason the aircraft is not plainly visible its attitude for other than straight and level flying must be estimated from the duration and sequence of beeps that have been transmitted. Even for experienced personnel this can be a difficult feat. During flare-out and touch down it is advantageous to be able to control the aircraft about its three axes of motion simultaneously. With the beep system of control, commands can only be transmitted in a sequential fashion which seriously restricts the preciseness of control and introduces additional time delay.

Referring more particularly to Fig. 2 a proportional control stick 40 initiates a source of pulses of variable width from pulse generator 41, the pulses being made proportional in width to the position of control stick 40. Separate channels provide variable width pulses for climb, dive, right turn and left turn. Pulses from each channel by means of modulator keyer 42 key on and off electronically a corresponding channel in modulator 44 at a reasonably high repetition rate, for example, 200 pulses per second. The pulses modulate a carrier and are transmitted by transmitter 45.

At the aircraft, the carrier with pulsed modulation impressed is detected at receiver 46 and the pulses of supersonic frequency are fed to the selector 47. In the selector 47, a circuit tuned to the frequency of the incoming supersonic signal amplifies the series of pulses. Additional circuits in the integrator unit 51 amplify and clip the rectangular pulse envelopes which are then integrated in integrator 48 and filtered to provide a D. C. voltage amplitude proportional to remote control stick displacement of proportional control stick 50. The D. C. voltage is then converted to 400 cycles per second A. C. by a mechanical chopper 49, filtered in filter network 50 and then introduced through control unit 52 to the signal circuits of the auto-pilot servo control system 36. In this manner the attitude of the aircraft in deviations, such as, for example, a climb is made proportional to the displacement of the control stick 40 from neutral. Similarly for other functions, dive, right and left turn, the amount of displacement of the control stick 40 from neutral to its forward right or left position determines a corresponding aircraft attitude.

In the following description with reference to the remaining figures of the drawing the coordinated turn and the climb-dive functions operate in a similar fashion, hence a description of the operations of one will in effect describe both. When there are differences, these will be brought out in detail.

The pulse generator and width control section 41 of the variable pulse length control unit 43 contains three stages, a D. C. amplifier, a multi-vibrator, and a D. C. restorer. The keyer stage 42 follows the D. C. restorer. With the control stick 40 in the neutral position, the B plus supply is removed from the above stages by switches S-1 and S-2 so that the resultant output is zero. If the stick 40 is moved back into the climb position, for example, a wiper arm on the stick potentiometer R18 also moves, giving an unbalanced bias to the grids of the two sections of the D. C. amplifier or triode variable resistance tubes V5. Tube V5 comprises a pair of triodes. The unbalanced bias to the grids of the two sections of triode variable resistance tubes V5 in effect varies the D. C. resistance of the two sections of that tube in opposite directions. Inasmuch as this variable resistance is connected into the grid circuits of multivibrator V6, the outputs of the multivibrator are such that one output will produce a wider pulse than the other. As the stick is displaced even further, the wide pulse becomes still wider and the narrow pulse becomes still narrower. If the stick 40 is moved forward into the dive position, then the reverse is true, the formerly short pulse now becomes the longer one. Thus, the upper resistance end of R18, the stick potentiometer, as shown in Fig. 3 of the drawings, is connected directly to the control grid of the right hand section as shown, of tube V5 and the lower resistance end of stick potentiometer R18 is connected directly to the control grid of the left hand section as shown, of tube V5. The cathodes of the two sections of D. C. amplifier V5 are tied together and grounded through resistor R23. A balance control potentiometer R21 is provided, the wiper or slider arm of potentiometer R21 being connected through sensitivity control resistor R19, which may be a variable resistor, through switch S2, thence through the resistance portion of a plate voltage potentiometer R21a through switch S1 and the sensitivity control variable resistor R5 and is then connected to the wiper or slider arm of balance control potentiometer R3 in the turn circuit. The slider arm of potentiometer R21a is directly connected to the high voltage section of dynamotor 60. The resistance ends of potentiometer R21 are connected to the control grids of the left and right hand sides as shown, of tube V5 through resistors R20 and R22, respectively. Thus a sensitivity control is incorporated consisting of variable resistor R19 in series with the B plus supply to the balancing potentiometer R21. This provides control of the range of control bias supplied to the D. C. amplifier tubes V1 and V5 so that the range of control bias supplied can be decreased and increased thereby reducing and increasing the sensitivity of the system to changes in stick displacement of proportional control stick 40. In the neutral position of the stick 40, if the B plus supply were applied, the multivibrator outputs would consist of equi-width rectangular pulses. This is brought about by balancing the voltages to the grids of the D. C. amplifiers V1 and V5 by means of balancing potentiometers, such as balancing potentiometer R21 for tube V5. This adjustment assures that the deflecting surface of the aircraft will start in the proper direction when the control stick is moved from neutral. A similar dual channel system contained in the variable pulse control unit exists for the coordinated turn function. Resistors R25 and R26 form respective plate loads for the two sections of D. C. amplifier V5 and are tied at their junction to the high voltage supply from the dynamotor through switch S2 and a portion of potentiometer R21a. Potentiometer R21a is provided to insure that the frequencies of multivibrators V2 and V6 will be equal.

The output at the plates of the sections of the D. C. amplifier V5 are resistance-coupled to the respective grids of the two sections of the multivibrator V6. As indicated, plate voltage for the sections of tube V5 is supplied through plate load resistors R25 and R26 from the dynamotor 60. Action of the sections of D. C. amplifier V5 as variable resistances on unbalancing of the stick potentiometer R18 cause a different level of D. C. voltage to appear at the grid of the upper stage and of the lower stage of multivibrator V6 as shown on the diagram in Fig. 3. Multivibrator V6 operates as follows: Assume the stick potentiometer R18 is unbalanced so as to provide for a climb function. In that position of the stick potentiometer R18 greater bias will be applied to the right hand section of the D. C. amplifier V5 than the left section causing a higher plate voltage at its plate and hence a higher voltage at the grid of the lower stage of multivibrator V6. In this condition the lower stage of multivibrator V6 is conducting more heavily and its plate is at low potential. This will provide a difference in length of the pulses between the two stages of the multivibrator. A common cathode resistor R28 is provided for proper bias of the multivibrator. Plate to grid coupling is provided respectively by capacitors C6 and C7. These capacitors together with resistor R24 and resistor R27 respectively provide for proper time constants. Plate voltage for the multivibrators is supplied through plate load resistors R29 and R30, respectively, the junction between these two resistors being tied to the 200 volt plate voltage supply through switch S2, a portion of resistor R21-A and thence through its wiper arm to the high voltage portion of dynamotor 60. Capacitors C8 and C9 respectively, provide coupling to the cathodes of the sections of the D. C. restorer V7, the D. C. restorer serving to clamp the positive half of the square wave output of the multivibrator V6 at ground potential. That is, the most negative portion of the positive output of the multivibrator is clamped to ground, i. e. placed at ground potential by action of the D. C. restorer V7. By virtue of the bias of 28 volts D. C. from the low voltage portion of dynamotor 60 applied to the sections of the keyer tube V8, the tube is normally not conducting during the negative portion of the square wave output of the multivibrator. On the positive swing of the square wave the 28 volt bias is overcome and causes the sections of the keyer tube to conduct. Resistors R33 and R34 respectively, provide current limiting functions. Resistors R31 and R32 respectively, provide grid resistances for grid return of the keyer to ground. Capacitor C10 provides adequate cathode bypass. Conduction of the respective sections of keyer V8 in effect causes the cathode of the respective connected section of modulator stage V207 or V208 to become connected to ground, thereby permitting conduction through the respective stage V207 or V208. The cathode of the respective tube V207 or V208 is grounded through the respective sections of V8 and through the 28 volt supply from the lower voltage section of dynamotor 60. Conduction of current through one of the tubes, as for example, V207 will cause that tube to go into oscillation. Frequency of oscillation of the modulator tube V207 is determined by the transformer and capacitor components of T207 by means of the inductance of the transformer and the fixed capacity shunting the transformer, some variation being provided by the variable capacitor in shunt with the transformer and temperature compensation being provided by the fixed capacitor across the shunted fixed capacitor across the coil of transformer T207. Resistor R220 and capacitor C234 provide for grid leak bias. Resistors R221 and R224 provide for isolation of the two modulator stages V207 and V208 from each other and by means of coupling through capacitor C238 and capacitor C243 the modulation output of tubes V207 and V208 are applied to the grid of modulator amplifier V211. The plates of the four modulator stages V209, V210, V207 and V208 are tied together and through common plate load resistor R35 are connected to a 250 volt positive source of D. C. voltage, capacitor C244A providing for bypass. As explained, output of the modulator stages is taken from their cathodes and coupled to power modulator output stage V211, the output voltage being impressed on the grid of that stage. Resistor R231 provides grid resistance and resistor R232 provides for cathode resistance. Capacitor C255A is a bypass condenser in the cathode circuit. The output of stage V211 is transformer-coupled to the transmitter which may be a conventional channel type transmitter and serves to modulate the transmitter carrier wave.

Upon functioning of the oscillators V209, V210, V207 and V208 it is thus seen that the transmitter carrier relay (not shown) will be closed.

The circuits including landing gear, auto cruise, cowl flaps, brakes, throttle and rudder relate to transmitter keying of those functions and do not form a part of the proportional control system except insofar as in a physical embodiment they are connected to the same junction box and this is therefore illustrated in Fig. 3 for purposes of continuity.

Referring more particularly to Fig. 5 of the drawings wherein is shown the selector and limited circuits, the receiver at the aircraft is not shown in schematic inasmuch as a conventional channel receiver may be utilized. We will still assume that the stick has been placed in the climb position for purposes of omitting duplication of description of the circuits for turn functions. The receiver in the aircraft will receive the variable pulse with amplitude modulated signal. From the receiver the detected signal is fed to the selector unit. In the selector unit, two circuits tuned to the two modulator oscillator frequencies select their respective signals. These signals again resemble rectangular pulses but have been distorted in the process of transmission. The output of the selector unit has been modified so that the climb or dive signals are applied to the integrator unit through two stages of clipping V14 and V16 to insure a constant amplitude output regardless of signal strength within limits. Preceding each limiter is a DC restorer circuit to establish a constant level output for varying pulse width inasmuch as the pulse would be averaged by passing through the coupling capacitor. The output of the last two limiters is fed through filters which filter out the pulsing frequency of approximately 200 cycles per second (C.P.S.).

Each signal will produce a D. C. voltage across its corresponding capacitor C27 or C28 of the filter (see Fig. 6). The resultant D. C. voltage amplitude across the two capacitors is directly proportional to the two pulse widths applied. Detailed circuit description and operation is as follows:

Pulses of supersonic energy have been transmitted from the transmitter 45 on a R. F. (radio frequency) carrier and are received in the receiver at the aircraft, the detected and amplified pulses of supersonic energy being coupled through transformers T1209, T1210, T1207 and T1211, as applicable. Assume a climb signal; wide pulses at a supersonic rate are coupled through transformer T1207 to the grid of selector V1207 and relatively narrow pulses at a supersonic rate are coupled through transformer T1211 to the grid of V1208, the dive selector stage. The resonant circuits of T1207 and T1211 are tuned to the supersonic frequency from the receiver. Taking stage V1207 in the climb channel, for example, resistor R1229 couples the supersonic signal to the control grid of that stage. Resistors R1220 and R1221 form a voltage divider network. Bias is provided by cathode resistor R1222 in conjunction with the fixed bias of 12 volts applied to the end of that resistor opposite its cathode-connected end. By-pass capacitor C1224A is provided for audio bypass. The capacitor disposed between the plate of stage V1207 and ground provides filter action for the detector. Relay K4 may be controlled by the pilot switch to switch its respective contacts to proportional control or to beep control as shown. In the case of proportional control, the plate V1207 is connected directly to resistor R50 which forms the plate load. Similarly for each of the other channels the contacts of K4 in proportional control will be in respective resistor position. The amplified and detected pulses from V1207 are coupled through capacitor C16 and applied through resistor R53 to the grid of V14, the clipping stage. The left hand section of V13 performs clamping action in climb position, its plate being disposed between resistor R53 of the clipping tube and coupling capacitor C16. The cathode of this section is at a bias of plus 12 volts D. C. The positive portion of the square wave will thus be clamped to plus 12 volts. Resistor R52 in conjunction with capacitor C16 has an RC time constant sufficient to provide proper clamping action. Clipping stage V16 insures a constant amplitude output regardless of signal strength within limits. As indicated, preceding the limiter is a D. C. restorer or clamping circuit to establish a constant level output for varying pulse width inasmuch as the pulse would be averaged by passing through the coupling capacitor. Stages V15 and V16 are provided to give additional clamping and limiting to get smooth clamping and limiting action. Resistor R62 and resistor R63 provide the plate load for the last limiter stage V16, the climb signal being applied from the plate of limiter V16 and fed through filters to filter out the pulsing frequency.

Referring to Fig. 6, the filter for the climb circuit, for example, comprises inductor L5 and capacitor C27. The D. C. voltage developed across capacitor C27 of the filter and the D. C. voltage across the corresponding capacitor C28 of the filter of the dive circuit causes a resultant D. C. voltage amplitude across both capacitors which is directly proportional to the two pulse widths applied. The voltage across capacitor C27 and C28 is added to the resistance portion of potentiometer R77 selected by its slider arm and applied through the contacts of the chopper K3 to transformer T6. Inductor L7 and capacitor C29 form a resonant circuit tuned to the 400 cycles per second output of the chopper circuit. Resistor R76 provides damping action for proper damping of the resonant circuit. Twenty-six volts A. C. are applied at 400 cycles through a phase shift network comprising rheostats R72, and R75, resistor R73 and the capacitors C32 and C33. The phase shifted A. C. voltage (400 cycle) is applied across the chopper excitation coil K3, causing its contacts to shift at a 400 cycle rate. The arm is vibrated alternately between contact 4 and contact 2 at the 400 cycle rate to cause an A. C. voltage at a 400 cycle rate across transformer T6 to be induced into its secondary. Stage V18 is a cathode follower actuated by the voltage from the secondary of transformer T6 and its output is taken across cathode resistor R79 and coupled through capacitor C30 to transformer T5. From the secondary of transformer T5 the signal is applied to the automatic control unit (see Fig. 7) to the slider arm of the gang potentiometer at potentiometer R31 which in turn controls the elevator action. It should be understood that if the control stick is displaced further in the climb position the resultant D. C. voltage will increase, hence increasing the amplitude of the A. C. voltage across T6. If the stick is returned to neutral the resultant D. C. voltage is zero, hence there is no A. C. voltage output. If the stick is displaced in the dive direction, the resultant D. C. voltage has changed polarity, hence the A. C. voltage will shift phase by 180 degrees. The A. C. signal is cathode coupled through stage V18 to the automatic pilot servo amplifier as described above where it is introduced in series through a potentiometer with voltages normally being fed to the servo amplifier in the automatic pilot.

The coordinated turn function from the receiver to the servo amplifier input requires a similar system to the one just described except for the following differences which should be brought out at this point in the application. The 400 cycle per second cathode coupled output amplifier V17 injects three signals through respective transformers T2, T3 and T4 in series with the rudder and aileron voltages at the grid of the first amplifier in the automatic pilot servo amplifier. By means of the potentiometers R77, R70 and R71 the proper ratio of elevator, rudder and aileron can be set up for coordinated turn similar to the action of R80 in the elevator circuit which provides for proper elevator shifting in response to the signal output through transformer T5. Since in a coordinated turn the elevator must move in the Up direction regardless of direction of turn, another transformer T4 from the cathode coupled amplifier V17 is used to supply voltage to a full wave rectifier consisting of the diode crystals 100, 101, 102 and 103. The D. C. output from this rectifier circuit is injected in proper polarity in series with the generated direct current of the climb-dive integrator network, thereby assuring Up elevator for either left or right turn. Resistor R78 and capacitor C34 provide for filtering of the rectified output of the full wave rectifier. The voltage across the portion of resistor R77 to the potentiometer slider arm is added to the voltage across capacitor C27 and capacitor C28, as hereinbefore described.

Referring more particularly to Fig. 7 wherein is shown the modified control unit of the present invention for controlling the auto-pilot of a remotely controlled aircraft, a climb signal having been induced into the secondary of transformer T5 will be fed through terminal points C and D to the control unit where it will be introduced at the slider arm of potentiometer R31. At this point the potentiometer arm of R31 may be displaced from the center tap connection to potentiometer R31 shown to the right of the slider arm. One end of transformer T5 is connected into the control unit at the potentiometer slide arm of potentiometer R31, the other end of the secondary winding of transformer T5 leading directly to the end of the stator of the pitch autosyn in the vertical gyro control unit in the auto-pilot. Thus, we have broken into the series of resistances controlling the elevator circuit to introduce signals representing remote proportional control from the control apparatus of the invention. In a similar manner output voltage is taken from transformer T2 and fed through lines H3 and G3 to the slider arm of potentiometer R33 in the rudder unit where voltage representing remote proportional control is introduced similar to the introduction into the elevator unit. In a similar manner, of course, the voltage induced in the secondary of transformer T3 is applied through lines E3 and F3 to the slider arm of potentiometer R32 in the aileron control system. One of the wires in each case, of course, is connected in series with the autosyns of respective signal channels of the auto-pilot. The auto-pilot circuits are not shown inasmuch as these are commercially available conventional units.

In making a turn it is also necessary to disengage the flux gate compass from the auto-pilot system. To accomplish this a set of relay contacts of disengage relay K–9 in the control unit shown also in the selector and limiter unit of Fig. 5 are connected in series with the contacts of K1–Y. The exciting relay of K1–Y is also connected in series with the common B plus supply of the clipper V12 of the turn circuit. The flux gate compass clutch is then disengaged in turn operation by the operation of the proportional control system.

Other control signals such as rudder-set and follow-up are introduced conventionally into the auto-pilot system. Turn center control is no longer available, but it is not necessary inasmuch as turn is completed in the remote proportional control system by returning the stick to neutral.

The remaining portions of the control system of Fig. 7 with the exception of the voltage regulating system are conventional in control systems for an auto-pilot and therefore are illustrated for the purpose of showing tie-in with existing control systems, but will not be described in this application.

In order to minimize inter-channel interference it was necessary to supply the integrator unit with a regulated D. C. supply voltage. This voltage is obtained from an electronic voltage regulator, shown in Fig. 11, the dynamotor of which is shown in Fig. 7, and which consists of that dynamotor shown in Fig. 7 and the associated vacuum tubes V19, V20, V21, V22 and V23. In addition, the pitch and turn channels in the selector unit are supplied by this regulated voltage.

The 200 volt regulated D. C. voltage is shown on line D2 and a bleeder comprising R83, R84 and R85 is disposed between this 200 volt line and ground. R84 is a potentiometer, the slider arm of which is directly connected to the control grid of tube V22. A voltage regulator tube which may be a gas-discharge tube V23 is connected in series with the cathode of tube V22 to ground. This clamps the cathode at the potential corresponding to the firing voltage of the voltage regulator V23. A plurality of tubes V19, V20 and V21 are disposed in parallel with each other in order to provide greater current-carrying characteristics. The grids of these tubes are respectively tied to the plate of tube V22. A plate load resistor R81 is provided in the plate circuit of tube V22. A resistor R82 is disposed between the cathode and the screen grid of tube V22. The plates of the tubes V19, V20 and V21 in parallel are hooked together and electrically connected to the 250 high voltage source from the dynamotor in the control unit.

Operation occurs as follows: Assume the 200 volt D. C. regulated output rises. The slider arm of potentiometer R84 will then be at a higher potential which will cause increased current flow through tube V22. This causes a decreased voltage at the plate of tube V22 which decreased voltage is applied to the grids of tubes V19, V20 and V21 respectively. The decreased voltage applied at the grids of these tubes in turn increases the total resistance through the parallel tube circuit causing the voltage drop through them to become greater. This in turn reduces the potential at the end of resistor R83 opposite the end connected to potentiometer R84 and once again brings the voltage to positive plus 200 volts D. C. Again, assume a decrease in voltage below 200 volts D. C. at the power input line. The potential at the slider arm of potentiometer R84 then decreases, decreasing the conductivity through tube V22 and increasing its plate voltage. This increase in plate voltage is reflected at the grids of respective tubes V19, V20 and V21 thereby permitting greater current flow through those tubes and decreasing the IR drop across that circuit. This in turn causes a greater voltage to appear at the 200 volt D. C. power output line until balance at the 200 volt point is restored. A capacitor C35 is inserted between the slider arm of potentiometer R84 and the 200 volt regulated supply for the purpose of suppressing dynamotor brush noise.

There is thereby provided apparatus to accomplish the functions of improving the precision of remote control exercised over drone aircraft during turn and climb and dive maneuvers and particularly during flare-out and touch down. The system presented overcomes the disadvantages of difficulty of exact attitude determination and permits remote control without undue difficulty even if the aircraft controlled is not visible. By the system described the advantage is gained of ability to control the aircraft about its three axes of motion simultaneously. Further advantages provided by the inventive system enable both climb-dive channel and turn channel to be keyed simultaneously and provides for proportional aircraft attitude to control stick displacement. These features enable the remote control pilot to maneuver the aircraft with a greater "feel" for the control stick and more precisely than is possible using previous systems. The system provided is relatively simple in design and can be made to utilize existing components of other systems for control.

Obviously, many alternate methods and forms of the apparatus are possible. For example, two separate potentiometers calibrated in degrees of pitch and bank for the control stick may be utilized instead of the present shown method. These could be set according to calibration to achieve the desired aircraft attitude. Still another considered possibility is to provide for feeding D. C. voltage from a computer to the proportional control to make it a component part of an automatic tracking and control system. Obviously, components different in nature than those shown by way of illustration could be inserted and the units could be modified in accordance with known engineering principles. The following partial table of part values is presented by way of illustration of one successful tested embodiment and is in no way to be construed as limiting the scope of the invention.

*Table of illustrative values of components*

| Components | Value | Unit |
|---|---|---|
| Resistors: | | |
| R2 | 33K | ohms. |
| R4, R22, R48, R49, R62, R63 | 20K | |
| R6, R23 | 220 | |
| R7, R10, R24, R27 | 5 meg | |
| R8, R9, R25, R26 | 120K | |
| R12, R13, R29, R30 | 3K | |
| R14, R15, R31, R32 | 10 meg | |
| R16, R17, R33, R34 | 150K | |
| R20 | 30K | |
| R28 | 390 | |
| R35 | 5K | |
| R36, R37, R50, R51 | 3,300 | |
| R38, R39, R40, R41, R44, R45, R46, R47, R52, R53, R54, R55, R58, R59, R60, R61. | 1 meg | |
| R42, R43, R56, R57 | 100K | |
| R68 | 10K | |
| R69, R70, R71, R79, R80 | 500 | |
| R65, R67, R73, R75 | 430 | |
| R78 | 160 | |
| R83, R85 | 70K | |
| R86 | 40 | (1 watt.) |
| R87 | 30 | (1 watt.) |
| Potentiometers: | | |
| R1, R18 | 1K | ohms. |
| R3, R21, R77 | 10K | |
| R21a | 25 | (35 watts.) |
| R84 | 200K | |
| Rheostats: | | |
| R5, R19 | 100K | |
| R64, R66, R72, R74 | 10K | |
| Capacitors: | | |
| C1, C2, C6, C7 | .001 | microfarads. |
| C3, C4, C8, C9, C11, C12, C13, C14, C16, C17, C18, C19, C22, C34. | .1 | |
| C20, C21 | 8 | (600 v.) |
| C23, C25, C26, C31, C32, C33 | .5 | (600 v.) |
| C27, C28 | 6 | (600 v.) |
| Inductors: | | |
| L1, L2, L5, L6 | 50 | henries. |
| L3, L4, L7, L8 | 3 | Do. |
| Rectifiers: | | |
| 100, 101, 102, 103 | IN34 | |
| Tubes: | | |
| V1, V5, V10, V14 | 12AX7 | |
| V2, V4, V6, V12, V16 | 12AU7 | |
| V3, V7, V9, V11, V13, V15 | 12AL5 | |
| V17, V18 | 6AR5 | |
| V19, V20, V21 | 6AQ5 | |
| V22 | 6AU6 | |
| V23 | 991 | |

Legend: K=10³ or 1,000. Figures in parentheses=power or voltage rating as applicable.

The inventive device herein may be adapted to be used with different existing auto-pilots without departing from the inventive principles taught herein. The illustrative embodiment is shown applied to an auto-pilot known commercially as the "Eclipse Pioneer P–1K Auto-pilot." Inasmuch as the auto-pilot is a known conventional unit only the connections thereto are illustrated in detail. The following table recites connections to auto-pilot units of this auto-pilot at the junctions illustrated on Fig. 7C of the drawings and designated as C4, C9 and C15, respectively.

| C4 | To Auto-pilot |
|---|---|
| CC | Left Turn Relay Contact Arm. |
| FF | Right Turn Relay Contact Arm. |
| HH | Turn Center Relay Contact Arm. |
| GG | Selector. |
| LL | Do. |
| MM | Ground. |
| OO | Do. |
| PP | Rudder Ckt. |
| QQ | Fast Response Ckt. |
| RR | Throw-out Relay in Disconnect Ckt. |
| T | 0° Rudder Offset Ckt. |

| C15 | To Auto-pilot |
|---|---|
| C3 | Pitch Autosyn. |
| BB | Power Transformer (and to N. O. clutch). |
| AA | Elevator Servo. |
| EE | Elevator and Rudder Servos. |
| DD | Rudder Servo. |
| O | Rate Gyro Control Rate Autosyn. |
| P | Do. |
| G3 | Master Direction Indicator Transmitting Autosyn. |
| II | Aileron Servo Follow-up Autosyn. |
| F3 | Vertical Gyro Control Bank Autosyn. |
| KK | Rudder Servo Follow-up Autosyn. |
| JJ | Aileron Servo Follow-up Autosyn Circuit. |
| EE | Aileron Channel of Servo Amplifier and Aileron Servo Follow-up Autosyn. |
| NN | Elevator Servo Follow-up Autosyn. |

| C9 | To Auto-pilot |
|---|---|
| J3 | 28 v. D. C. source at inverter (used also for auto-pilot tube filaments). |
| SS | N. O. Clutch in Master Direction Indicator. |
| TT | Ground. |
| TT | Do. |
| UU | Rudder, Aileron and Elevator Servo Follow-up Autosyns. |
| AB | Gyro Flux gate Transmitter Caging Motor. |
| BA | Gyro Flux gate Transmitter Gyro and to Vertical Gyro Control Gyro. |
| VV | Inverter 115 v. A. C. Supply, Servo Amplifier and Servos. |
| WW | Vertical Gyro Control Caging Switch. |
| XX | Inverter 115 v. A. C. Supply. |
| YY | Vertical and Rate Gyro Control Gyros, BA and to Gyro Flux gate transmitter gyro. |
| B3 | Vertical and rate servo control gyros and Gyro Flux gate transmitter caging motor. |
| ZZ | Gyro Flux gate transmitter caging switch. |

Obviously, many modifications and variations of the present invention are possible in the light of the above teachings. It is, therefore, to be understood that within the scope of the appended claims the invention may be practiced otherwise than as specifically described.

What is claimed is:

1. Apparatus for remote proportional control of aircraft attitude during maneuvers and in level flight comprising a control stick to initiate signals proportionately representative of the amount of displacement of said control stick from a neutral position to effect a corresponding change in attitude of the aircraft by control of the control surfaces of the aircraft, a variable pulse length control unit comprising a stick potentiometer responsive to positioning of said control stick to produce an output signal, a A.-C. amplifier including a first triode section and a second triode section and arranged to be responsive to the output signal from said stick potentiometer to produce two output signals whose amplitudes vary in an inverse manner, bias means to bias said D.-C. amplifier, a balance control potentiometer constructed and arranged to effect equal outputs from the D.-C. amplifier when said stick potentiometer is in said neutral position, a multivibrator having first and second output means and responsive to the output signals from the D.-C. amplifier to produce at said first and second output means first and second output signals consisting of pulses whose time width ratio varies in accordance with the position of said control stick, keyer means responsive to the output signals of said multivibrator to become energized for the duration of said output signals, circuit means including modulator means constructed to be responsive to the energizing of said keyer means to produce first and second modulated signals whose modulation is in accordance with the first and second output signals respectively from said multivibrator and having predetermined frequencies, transmitter means responsive to said modulated signals to produce a signal modulated in accordance with said first and second modulated signals, receiving means constructed to receive and detect the transmitted signal from said transmitter, selector means for selecting components of the detected signal having said predetermined frequencies, integrating and combining means responsive to the output of said selector means for producing a resultant D.-C. signal whose magnitude varies in accordance with the position of said control stick, and means comprising a chopper and a filter for producing from said resultant D.-C. signal an A.-C. signal having a given frequency and whose magnitude varies with the magnitude of said resultant D.-C. signal, and a control unit responsive to said last-named A.-C. signal to control the servo system of an auto-pilot to effect aircraft attitude corresponding to the position of said control stick.

2. The apparatus of claim 1 in which said modulator means comprises a plurality of tubes each having an anode, a control electrode and a cathode, each of said tubes being driven by a corresponding keyer means, said tubes having a common anode resistor, said modulator tubes comprising modulator oscillators normally biased to cut off, the cathodes of said modulator oscillators being connected to ground through said keyer means, an amplifier including a vacuum tube comprising an anode and a control electrode and arranged to be responsive to the modulator oscillator output signals supplied thereto through associated resistors and capacitors connected in series arrangement with the control electrode of said amplifier to amplify said output signals, a transformer in the anode circuit of said amplifier to effect relay operation in said transmitter means so as to produce modulated carrier pulses from said transmitter means.

3. The apparatus of claim 2 in which said selector means includes circuits tuned to the modulator oscillator frequencies, a pair of limiter clipping stages to insure constant amplitude output signal regardless of variations in signal strength within limits following said selector, a D.-C. restorer preceding each limiter to establish constant level output for varying pulse width in which said integrator includes filters having respective inductors and capacitors in the outputs of the limiters to filter out the pulsing frequency, the integrator constructed to produce a D.-C. voltage across corresponding capacitors of the filter in response to output signals from said D.-C. restorer, the D.-C. voltage being directly proportional to the pulse widths applied, a 400 cycle chopper circuit including a chopper exciting coil, said circuit constructed to produce a multi-cycle square wave output having an amplitude corresponding to the amplitude of the output signal of said integrator, a multi-cycle resonant network constructed to produce a signal having a sine wave form from the square wave output signal of the chopper, and a cathode follower for supplying signals from the resonant network into the control unit of an auto-pilot.

4. The device of claim 3 including a flux gate compass disengage relay responsive to turn signals introduced into the selector unit, the selector limiters including turn circuit limiters, said flux gate compass disengage relay comprising an inductor responsive to current flow through the turn circuit limiters to actuate a no-operate compass clutch and a flux gate disengage relay to activate the clutch to disengage the flux gate compass.

5. Apparatus for proportional control comprising a displaceable control device, a bistable device having two stable states and arranged to be responsive to the amount of displacement of said control device to alternately assume each of its two stable states for periods of time which are unequal in a degree proportionate to the amount of displacement of said control device, means for deriving from said bistable device a first signal consisting of pulses whose time duration varies proportionally with the periods of time said bistable device is in its first stable state, means for deriving from said bistable device a second signal consisting of pulses whose time duration varies proportionally with the periods of time said bistable device is in its second stable state, means for producing and transmitting a carrier signal modulated in accordance with said first and second signals, and receiver means constructed to produce from said transmitted signal a resultant output signal whose magnitude is proportional to the inequality of said time periods.

6. Apparatus for proportional control of remotely located devices comprising a displaceable control means, circuit means including at least one bistable device having two stable states and arranged to be responsive to the amount of displacement of said control device to alternately assume each of its two stable states for periods of time which are unequal in a degree proportionate to the amount of displacement of said control means, means for deriving from said bistable device a first output signal comprised of a series of pulses having a time duration which varies with the length of time said bistable device is in its first stable state, and other means for deriving from said bistable device a second output signal comprised of a series of pulses having a time duration which varies with the length of time said bistable device is in its second stable state, modulating means individually responsive to each of said first and second output signals to produce corresponding bursts of signals having preselected frequencies and having time durations in accordance with the time duration of the corresponding pulses, transmitting means for producing a carrier signal modulated by said bursts of signal, means for receiving said transmitted signal, and means for selecting from the received signal the various signal components thereof having said pre-selected frequencies, and means responsive to the components which were derived from the first and second output signals of a given bistable device to produce a control signal whose amplitude is proportional to the difference of the average amounts of energy in the originating components.

7. Apparatus for proportionate control of remotely located devices in accordance with claim 6 in which said circuit means further comprises circuitry responsive to the displacement of said displaceable control means to produce at least two unilateral voltages whose amplitudes vary in an inverse relationship with respect to each other in an amount proportional to the amount of displacement of said control device, and in which a given bistable device comprises a multivibrator arranged to be responsive to the said two unilateral voltages.

8. Apparatus for proportionate control of remotely located devices in accordance with claim 6 in which said means for producing bursts of signals comprises keying means and tuned circuit means associated therewith, said keying means constructed to become energized for the duration of a signal applied thereto from a given bistable device and said tuned circuit means constructed and arranged to become energized in response to energization of the associated keying means.

9. Apparatus for proportionate control of remotely controlled devices comprising a displaceable control means, circuit means including at least one bistable device having two stable states and arranged to be responsive to the amount of displacement of said control means to alternately assume each of its two stable states for periods of time which are unequal in a degree proportionate to the amount of displacement of said control means, means for deriving from each of said bistable devices a first output signal comprised of a series of pulses having a time duration which varies with the length of time the associated bistable device is in its first stable state, and means for deriving from each of said bistable devices a second output signal comprised of a series of pulses having a time duration which varies with the length of time the associated bistable device is in its second stable state, means individually responsive to said first and said second output signals to produce corresponding bursts of signal having preselected frequencies and having time durations in accordance with the time duration of the corresponding pulses, transmitting means for producing a carrier signal modulated by said bursts of signal, means for receiving and detecting said transmitted signal, and means for deriving from said detected signal a signal whose amplitude is proportional to the difference in the time duration of the pulses of the first and second output signals of each of said bistable devices, said last-named means being comprised of a plurality of selecting means tuned to said predetermined frequencies, integrating means individually responsive to the output signal of each of said selecting means to produce a unilateral signal whose amplitude is proportional to the amount of energy in the output signal of the associated selecting means, and combining means responsive to the particular unilateral signals which originate in the same bistable device to produce a resultant D.-C. signal whose amplitude is proportional to the difference of amplitudes of said particular unilateral signals.

References Cited in the file of this patent

UNITED STATES PATENTS

| | | |
|---|---|---|
| 2,397,476 | Maxson | Apr. 2, 1946 |
| 2,676,770 | Schuck | Apr. 27, 1954 |

UNITED STATES PATENT OFFICE

CERTIFICATE OF CORRECTION

Patent No. 2,810,533
October 22, 1957

Donald M. Lauderdale et al.

It is hereby certified that error appears in the printed specification of the above numbered patent requiring correction and that the said Letters Patent should read as corrected below.

Column 6, line 39, for "limited" read -- limiter --; column 11, line 66, for "A.-C." read -- D.-C. --.

Signed and sealed this 17th day of December 1957.

(SEAL)
Attest:
KARL H. AXLINE
Attesting Officer

ROBERT C. WATSON
Commissioner of Patents